United States Patent [19]

Krouse et al.

[11] 3,912,057

[45] Oct. 14, 1975

[54] AUTOMATIC BRAKE RELEASE MEANS

[75] Inventors: Wayne Lauron Krouse; James Anton Miller, both of Dubuque, Iowa

[73] Assignee: Deere & Company, Moline, Ind.

[22] Filed: May 3, 1974

[21] Appl. No.: 466,950

[52] U.S. Cl. ............... 192/4 C; 192/3 N; 180/6.48; 188/170
[51] Int. Cl.² .................. B60K 41/26; F16D 67/00; B62D 11/00
[58] Field of Search ............ 192/3 R, 3 H, 3 S, 4 A, 192/4 C, 3 N; 180/6.48; 91/41, 45; 188/170

[56] References Cited
UNITED STATES PATENTS

| | | | |
|---|---|---|---|
| 3,672,161 | 6/1972 | Krusche et al. ............... | 180/6.48 X |
| 3,743,064 | 7/1973 | Luft ................................. | 192/3 R |
| 3,759,357 | 9/1973 | Bianchetta ...................... | 192/3 R |
| 3,795,109 | 3/1974 | Bojas et al. ..................... | 180/6.48 X |
| 3,837,449 | 9/1974 | Drone ............................. | 192/4 C |
| 3,841,450 | 10/1974 | Drone et al. .................... | 192/4 C |

*Primary Examiner*—Benjamin W. Wyche
*Assistant Examiner*—Lance W. Chandler

[57] ABSTRACT

The opposite tracks of an excavator are each driven through a drive including at least one reversible, rotary hydraulic propel motor. In order to prevent the propel motors from overspeeding and cavitating when the excavator is descending a hill or making a turn, a counterbalance valve assembly is located in each of the propel circuits. Connected in each of the propel circuits in fluid communication with the counterbalance valve assembly located therein is a pilot-operated brake release valve for controlling a normally engaged hydraulically releasable brake associated with a respective one of the drives for the tracks of the excavator. When pressure fluid is being directed to the propel motors, it acts to actuate the brake release valves so as to connect the pressure fluid to respective actuators for the brakes to cause disengagement of the brakes. This actuation of the brake release valves occurs at a predetermined pressure and the counterbalance valve assemblies act to maintain this predetermined pressure in the propel circuit so as to maintain the brakes in their disengaged condition when the propel motors are operating.

6 Claims, 2 Drawing Figures

AUTOMATIC BRAKE RELEASE MEANS

BACKGROUND OF THE INVENTION

The present invention relates to a brake release valve operated in response to pressure fluid in a propel circuit for operating a hydraulic propel motor.

It is a common practice to embody at least one hydraulic motor in each of a pair of drives for driving a pair of endless tracks mounted at the opposite sides of a track-laying vehicle. In order to insure that the vehicle will not roll when the propel motors are in neutral, non-driving conditions, a normally engaged, spring-loaded brake is associated with each track drive, the brakes being automatically hydraulically disengaged in response to the propel motors being actuated to a driving condition.

One problem attendant with the known brake systems is that the brakes tend to drag when the propel motors are operating at low power working conditions.

SUMMARY OF THE INVENTION

According to the present invention, there is provided an improved brake system for use with a track-laying vehicle having opposite track drives, the latter each including at least one hydraulic propel motor.

An object of the invention is to provide a brake system for each of the track drives referred to in the foregoing paragraph, the brake system including a hydraulic actuator for releasing the brake and a normally closed brake release valve responsive to a predetermined pressure in the propel circuit to shift to an open position connecting the fluid pressure to the brake actuator and being responsive to a pressure less than the predetermined pressure to remain in its open position.

A more specific object is to provide a track drive as aforedescribed which includes counterbalance valve means connected in the propel circuit for preventing cavitation of the propel motor, the counterbalance valve acting to maintain the pressure in the propel circuit at the predetermined pressure for opening the brake release valve when the propel motor is being operated.

Yet another object is to provide a brake release valve including valve member means having a relatively small area exposed to pressure in the propel circuit when the valve is closed and having a larger surface area exposed to the pressure in the propel circuit when the valve is in its open position whereby a smaller pressure is required to maintain the valve in its open position once it has opened.

These and other objects will become apparent from reading the ensuing description in conjunction with the appended drawings.

DESCRIPTION OF THE PREFERRED EMBODIMENT

The present invention will be described as applied to the track drives of an earth-working excavator, but it will be appreciated that the invention is applicable to many other types of drives utilizing a hydraulic drive motor and a hydraulically releasable brake which is automatically disengaged when a source of fluid pressure is connected to the drive motor.

Figure 1:
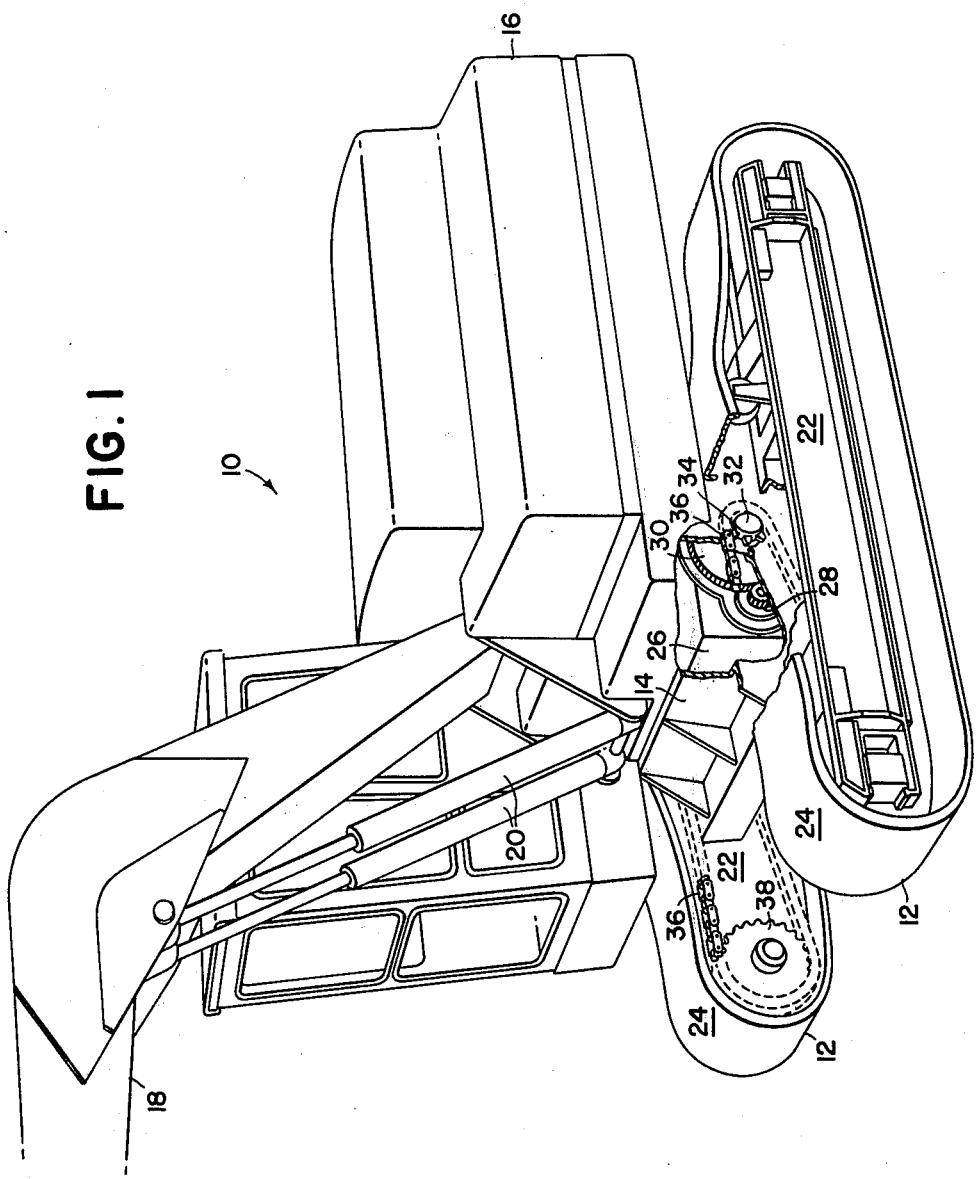
FIG. 1 is a somewhat schematic left front perspective view of an excavator embodying the present invention.

FIG. 1 is a perspective view showing an earth-working excavator 10 having a pair of ground-engaging endless track structures 12 mounted on a lower body or chassis so as to be at the opposite sides thereof. As is conventional, an upper body portion 16 is mounted on the lower body 14 for rotation about a vertical axis by means of a conventional slewing means (not shown). A boom 18 is mounted on the upper body 16 for movement with the latter and for vertical swinging movement relative thereto under the control of a pair of extensible and retractable hydraulic actuators 20. The boom 18 is provided for supporting an excavator bucket and dipper stick (not shown) as is conventional.

The endless track structures 12 include elongate track support structures 22 having respective endless tracks 24 extending thereabout. While for the purposes of the present invention, any variety of drives could be used for driving the endless tracks 24, the one illustrated includes respective propel motors 26, of which only the left propel motor is shown. Propel motors 26 each include an output shaft on which is mounted a drive pinion 28 meshed with a gear 30 mounted on an end of a shaft 32. Mounted on the other end of the shaft 32 is a sprocket 34 drivingly connected, through means of a drive chain 36 with a drive sprocket 38 (only the right drive sprocket is shown) drivingly engaged with a respective endless track 24.

Figure 2:
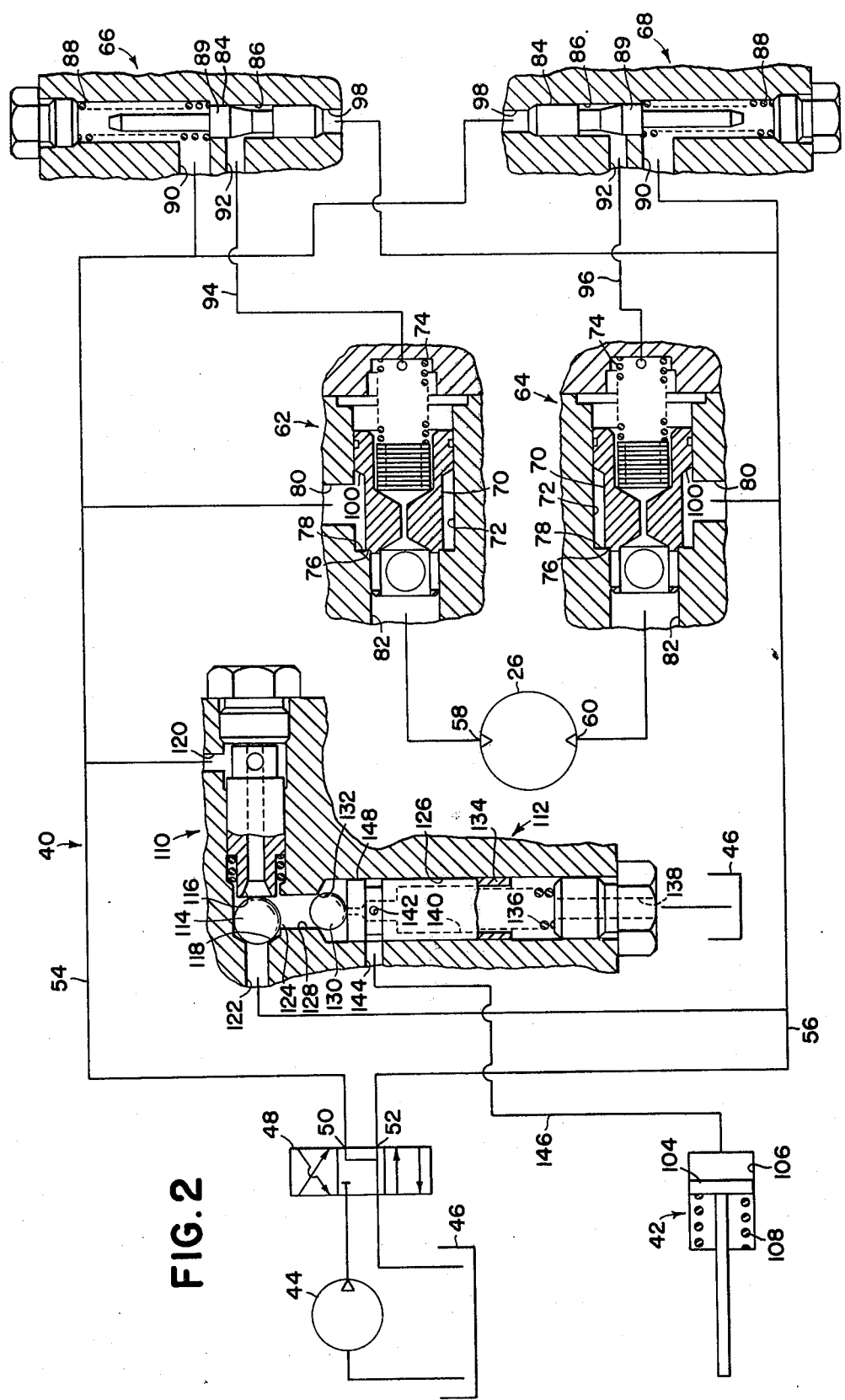
FIG. 2 is a schematic view showing hydraulic circuitry and valving used in controlling a propel motor and a brake for the propel drive.

Referring now to FIG. 2, there is shown a hydraulic system 40 for controlling the operation of a respective propel motor 26 and of a normally spring-engaged, hydraulically-releasable brake 42 only partly shown, the brake 42 being advantageously placed in a respective drive train between one of the propel motors 26 and drive sprockets 34 in a conventional manner (not shown) for normally maintaining the drive train in a braked condition. It is to be understood that the hydraulic system 40 forms only a portion of the hydraulic circuitry used for controlling other hydraulic functions of the excavator, this fact having a significance which will be explained below. Thus, the hydraulic system 40 includes a pump 44 having its inlet connected to a reservoir 46, the reservoir and the outlet of the pump being connected to a direction control valve 48. Respectively connected to opposite control ports 50 and 52 of the control valve 48 are propel motor control lines 54 and 56, which are connected to the reservoir 46 when the control valve 48 is in a centered, neutral position as shown. When the valve 48 is shifted downwardly from its neutral position, the control lines 54 and 56 will respectively be connected to the reservoir 46 and the pump 44, and when the valve 48 is shifted upwardly from its neutral position, the control lines 54 and 56 will respectively be connected to the pump 44 and the reservoir 46. The flow of fluid between the propel motor control lines 54 and 56 and respective motor work ports 58 and 60 is controlled through counterbalance valving including identical upper and lower flow poppet valves 62 and 64 and identical upper and lower pilot poppet valves 66 and 68. The flow poppet valves 62 and 64 each include a poppet valve element 70 axially shiftably mounted in a valve bore 72. Each of the valve elements 70 is biased leftwardly by means of a coil compression spring 74 to a normally closed position wherein a leftwardly facing seating surface 76 thereof is engaged with a valve seat 78 formed by the bore wall between axially spaced ports 80 and 82. The ports 80 and 82 of the upper valve 62 are respectively connected to the propel motor control line 54 and the motor work port 58 while the ports 80 and 82 of the lower valve 64 are respectively connected to the propel motor control line 56 and the motor work port 60.

The upper and lower pilot poppet valves 66 and 68 each include a poppet valve element 84 axially shiftably mounted in a bore 86. A coil compression spring 88 acts on each of the poppet valve elements 84 and normally holds the latter in a closed position wherein a valve section thereof is seated in the bore 86 so as to prevent the flow of fluid between axially spaced ports 90 and 92, the ports 90 and 92 of the upper pilot poppet valve 66 being respectively connected to the propel motor control line 54 and a line 94 connected to the right end of the bore 72 of the upper flow poppet valve 62, and the ports 90 and 92 of the lower pilot poppet valve 68 being respectively connected to the propel motor control line 56 and a line 96 connected to the right end of the valve bore 72 of the lower flow poppet valve 64. For the purpose of opening the poppet valve element 84, of the poppet valves 62 and 64, respectively against the force of the springs 88, the propel motor control line 56 is connected to a pilot pressure port 98 located in the bore 86 at the end of the valve element 84 which is remote from the spring 88 and the propel motor control line 54 is similarly connected to the corresponding pilot pressure port 98 of the lower pilot poppet valve 68.

Thus, it will be appreciated that when the direction control valve 48 is shifted upwardly from the position illustrated the control line 54 will convey pressure fluid while the line 56 will convey return fluid. The pressure fluid in the line 54 will act against a surface 100 of the valve element 70 of the upper flow poppet valve 62 and will shift the valve element to an open position wherein flow is permitted between the ports 80 and 82 to thus connect the control line 54 to the motor work port 58. At the same time, the pressure in the control line 54 will have opened the lower pilot poppet valve 68 so as to connect the right end of the valve bore 72 of the lower flow poppet valve 64 to the control line 56. Return fluid exiting from the motor work port 60 will then act on the left end of the poppet valve element 70 of the lower flow poppet valve 64 to cause the valve element to shift rightwardly so as to connect the motor work port 60 to the control line 56. If the control valve 48 is instead shifted downwardly from the position illustrated, the operation will be quite similar to that just described except now the control line 56 will be connected to fluid pressure while the control line 54 is connected to the reservoir 46. Thus pressure in the line 56 will act on the surface 100 of the valve element 70 of the lower flow poppet valve 64 to cause it to shift rightwardly so as to connect the line 56 to the motor work port 60. At the same time the pressure in the line 56 will have caused the valve element 84 of the upper pilot poppet valve 66 to have shifted to its open position connecting the right end of the bore 72 of the upper flow poppet valve 62 to the control line 54 thus permitting the fluid exiting from the motor work port 58 to unseat the valve element 70 of the upper flow poppet valve 62 so as to connect the motor work port 58 to the control line 54.

The operation just described is that which occurs during normal operation when the propel motors are driving the drive tracks 38 of the excavator 10. The primary purpose of the counterbalance valving comes into play when the excavator is either descending a hill or making a turn. Under these conditions one or the other or both of the tracks might try to go faster than one or the other or both of the propel motors 26 is being supplied with fluid to in effect make the motors act as pumps. For example, assuming that the control valve 48 is shifted upwardly from its neutral position shown, such that the pump 44 is connected to the control line 54 and the reservoir 46 is connected to the control line 56, the pressure in the line 54 will drop when the motor tends to act as a pump so as to tend to deplete the supply of oil from the line 54 faster than it is being supplied by the pump 44. When the pressure in the line 54 drops to a predetermined pressure, the pressure in the line 54 will no longer be sufficient to maintain the poppet valve element 84 of the lower pilot poppet valve 68 in its open position. When this happens, the pressure at the right end of the valve element 70 of the lower flow poppet valve 64 will cause the valve element 70 to close to prevent the flow of fluid from the motor work port 60 to the control line 56. Pressure will then build up through the pump and into to the control line 54. As the pressure in the control line 54 increases, it again overcomes the force of the spring 88 acting against the valve element 84 of the lower pilot poppet valve 68 so as to again open the valve element 84 and connect the right end of the bore 72 of the lower flow poppet valve 64 to the control line 56. Thus, with the pressure relieved at the right of the valve 70 it will shift rightwardly to its open position so as to connect the motor work port 60 with control line 56. Of course, a similar operation takes place when the control valve 48 is shifted downwardly from the neutral position shown so as to connect the pump 44 to the control line 56 while connecting the reservoir 46 to the control line 54. It will be appreciated than that when the control lines 54 and 56 are respectively connected to the pump 44 the lower and upper pilot poppet valves 68 and 66 respectively act to modulate the pressure in the lines 54 and 56 so as to maintain it at a predetermined value corresponding to that which is necessary for unseating the valve elements 84 against the springs 88.

The brake 42 may be of any conventional type comprising some sort of actuating linkage including a spring acting on the linkage to maintain the brake in a normally engaged position and including a cylinder to which the flow of fluid under pressure may be controlled so as to selectively move the linkage against the action of the spring so as to cause disengagement of the brake. One such brake construction is illustrated in U.S. Pat. No. 3,282,411 issued to Stauffer on 1 Nov. 1966. For the purposes of illustration, only that part of the brake 42 for receiving a control input is shown here and it includes a piston 104 located in a cylinder 106 and engaged with one end of a spring 108 provided for normally maintaining the brake in its engaged condition.

For the purpose of automatically effecting disengagement of the brake 42 when one or the other of the propel motor control lines 54 and 56 are connected to the pump 44 by actuation of the control valve 48, the cylinder 106 of the brake 42 is connected to the control lines 54 and 56 through a brake release circuit including a shuttle valve 110 and a brake release valve 112. Specifically, the shuttle valve 110 includes a check ball 114 located in a chamber defining valve seats 116 and 118 respectively at its right and left ends, as viewed in FIG. 2. Right and left ports 120 and 122 open centrally into the valve seats 116 and 118 and are respectively connected to the propel motor control lines 54 and 56. The shuttle valve 110 includes an outlet port 124 communicating with the chamber midway between the valve seats 116 and 118. Thus it will be appreciated that when the pressure in the line 54 is greater than that in the line 56 the check ball 114 will be seated against the left valve seat 118 to prevent flow from the line 54 to the line 56 and that the check ball 114 will be seated against the right valve seat 116 when the pressure in the control line 56 is greater than that in the control line 54.

The brake release valve 112 includes a valve bore 126 having an inlet port 128 at one end thereof connected to the outlet port 124 of the shuttle valve 110. Located in the valve bore 126 is release valve element means including a check ball 130 normally held in engagement with a valve seat 132, located at the location where the inlet port 128 opens into the bore 126, by a spool valve element 134 reciprocally mounted in the valve bore 126 and biased against the check ball 130 through means of a coil compression spring 136. At a location at the opposite end of the spool valve element 134 from the inlet port 128, a return port 138 is connected to the bore 126 and to the reservoir 46. The spool valve element 134 includes a passage 140 extending axially therethrough and when the spool valve element 134 is in its normally closed position illustrated, a plurality of radial orifices 142 in the spool valve element 134 connect the passage 140 in fluid communication with a brake control port 144 connected to the brake cylinder 106 through means of a line 146. When a predetermined pressure acts on the check ball 130 it will be forced from the valve seat 132 and will cause downward movement of the spool valve element 134 so as to position an upper land portion 148 thereof so as to permit flow between the inlet port 128 and the brake control port 144 to effect disengagement of the brake 42. Of importance is the fact that once the check ball 130 is unseated the fluid pressure at the inlet port 128 will act on the larger area presented by the upper end of the spool valve element 134 so that once the check ball 130 has been unseated a lesser pressure is required to maintain the spool valve element 134 in its opened position. Also of importance is the fact that the spring 136 of the brake release valve 112 is chosen that it will be overcome when the pressure in one or the other of the control lines 54 and 56 is at a value sufficient for overcoming the respective springs 88 of the upper and lower pilot poppet valves 66 and 68 of the counterbalance valving and that the spring 108 of the brake 42 is chosen such that the brake will be released at a pressure considerably less than that which is required for opening the brake release valve 112.

Thus, it will be appreciated that the pressure which must exist at the inlet port 128 of the brake release valve 112 in order to unseat the check ball 130 will be sufficient to quickly release the brake 42. This is important in order to reduce brake drag. Also, since the counterbalance circuitry acts to maintain the pressure in one or the other of a control lines 54 and 56 at the value necessary for unseating the check ball 130 and since the brake 42 is designed to be released at a pressure somewhat less than the pressure necessary for unseating the check ball 130, there is little likelihood that the brake will become engaged when the control valve 48 is in either of its upper and lower positions for actuating the propel motor 26. Further, when the control valve 48 is in its neutral position as shown, pressure spikes as what might appear in the lines 54 and 56 due to operations of other components in the system not shown, such as the boom actuators 20, will be isolated from the brake 42 since the spring 136 of the brake release valve 112 will maintain the check ball 130 firmly seated.

The foregoing is thought to be a sufficient description of the operation of the present invention and no further description is given for the sake of brevity. Suffice it to say that while the present invention has been shown in conjunction with a circuitry for controlling a propel drive, the brake release valve 112 could similarly be employed in circuitry for controlling a swing drive for rotating the upper body 16.

We claim:

1. A hydraulic control system for controlling the flow of fluid to and from first and second work ports of a reversible hydraulic drive motor and to and from a piston-containing cylinder of a normally engaged hydraulically releasable brake means adapted for braking a drive including the motor, comprising: a pump and a reservoir connected to a motor control valve means which is in turn connected to said first and second work ports respectively through means of first and second fluid line means; said control valve means being shiftable among neutral, first actuated and second actuated positions for respectively establishing neutral, forward and rearward driving conditions in said motor respectively wherein the first and second work ports are both connected to the reservoir, are respectively connected to the pump and reservoir and are respectively connected to the reservoir and pump; a brake release valve means connected to said first and second fluid line means, to said reservoir and to said cylinder of said brake means and including valve element means shiftable, in response to a first predetermined minimum pressure in either one of said first and second control line means, from a normally closed position wherein the cylinder is connected to said reservoir, to an open position wherein the cylinder is connected to said either one of said first and second fluid line means; said valve element means including means operative once said valve element means is in said open position to maintain said valve element means in its open position as long as the pressure in said one of said first and second fluid line means remains above a second predetermined minimum pressure, which is less than said first predetermined minimum pressure; and said brake means including yieldable means acting against a piston in said cylinder and normally maintaining said brake means in its engaged position but being yieldable in response to said second predetermined minimum pressure acting on said piston to permit the brake means to become disengaged.

2. The control system defined in claim 1 wherein said first and second fluid line means include counterbalance valve means for maintaining the pressure in said first and second control line means at said first predetermined minimum pressure respectively when said motor control valve means is in said first and second actuated positions; and said valve element means having first and second surface means so located relative to a connection of the brake release valve means with said first and second control line means and being so dimensioned relative to each other that the valve element means will be moved to its open position in response to said first predetermined minimum pressure but will be maintained in said open position at a pressure somewhat less than said first predetermined minimum pressure.

3. The hydraulic control system defined in claim 2 wherein said brake release valve means includes a valve bore having an inlet port at one end and an outlet port at the other end; the inlet and outlet ports being respectively connected to said first and second control line means and to said reservoir; said valve element means including a check ball, normally seated against a seat located such that said check ball blocks flow to the bore from said inlet port, and a spool valve member slidable in the bore and having an end normally engaged with the check ball and biasing means urging the spool valve member towards said check ball; and said surface means including that portion of the check ball positioned so as to be exposed to fluid pressure at said inlet port when the check ball is seated and the surface of said one end of the spool valve member; and said spool valve member having land means so positioned relative to said inlet and outlet ports and to a brake control port, which is connected to the cylinder, that when the valve element means is in its closed position, the control port is connected to the outlet port and when the valve element means is in its open position the control port is connected to the inlet port and blocked from the outlet port.

4. In a vehicle having a body portion supported at its opposite sides on a pair of rotatable ground-engaging means, a reversible hydraulic motor means for rotating each ground-engaging means, first and second fluid circuits respectively connecting first and second work ports of the motor means to a direction control valve, the direction control valve being connected to a source of fluid pressure and a reservoir and being selectively shiftable among neutral, first and second positions to respectively establish neutral, forward and reverse driving conditions in the motor means respectively wherein the first and second fluid circuits are both connected to the reservoir, are respectively connected to the source of fluid pressure and the reservoir and are respectively connected to the reservoir and source of fluid pressure, and hydraulically releasable brake means normally preventing rotation of each of the pair of ground-engaging means, the improvement comprising: a pilot-operated brake control valve means connected to the first and second fluid circuit means, to a hydraulically operable means of said brake means which is responsive to fluid pressure for disengaging said brake means and to the reservoir; said brake control valve means including valve member means operable in response to a predetermined fluid pressure in one of the first and second fluid circuit means to move from a closed position, connecting the hydraulically operable means to the reservoir, to an open position connecting said one of the first and second fluid circuit means to the hydraulically operable means; and said valve member means including surface means so located that a pressure less than said predetermined pressure is required for maintaining the valve member means in its open position once it has been opened and said hydraulically operable means being responsive to a pressure less than said predetermined pressure for effecting disengagement of said brake means.

5. The vehicle defined in claim 4 wherein a counterbalance means is connected in the first and second fluid circuits leading to the first and second work ports of a respective motor means and operable for respectively maintaining the pressure in said first and second fluid circuits at said predetermined value when the direction control valve is in said first and second positions whereby sufficient pressure for disengaging said brake means will be assured when the motor means is in either actuated to its forward or its rearward driving condition.

6. The vehicle defined in claim 4 wherein said pilot-operated brake control means includes a valve bore having a passage leading into an end thereof; said valve member means including a check valve located in the bore and normally held in blocking relationship to said passage by a spring-biased spool member having an end surface engaged with the check valve; said spool member normally connecting said hydraulically operable means of the brake means to the reservoir; and said end surface of the spool member being larger that the surface area of that portion of the check valve normally exposed to pressure in the passage means.

* * * * *